United States Patent [19]

Pritchard

[11] 4,009,885
[45] Mar. 1, 1977

[54] STEREO PHONOGRAPH PICK-UP CARTRIDGE

[75] Inventor: Peter E. Pritchard, New Milford, Conn.

[73] Assignee: Sonic Research Inc., Danbury, Conn.

[22] Filed: Sept. 8, 1975

[21] Appl. No.: 611,214

[52] U.S. Cl. .......................... 274/37; 179/100.41 K
[51] Int. Cl.² ...................... G11B 3/46; H04R 1/16; H04R 11/08
[58] Field of Search ............................ 274/37, 38; 179/100.41 K, 100.41 M, 100.41 Z

[56] References Cited

UNITED STATES PATENTS

| | | | |
|---|---|---|---|
| 2,622,156 | 12/1952 | Baker | 179/100.41 Z |
| 3,294,405 | 12/1966 | Pritchard | 274/37 |
| 3,349,194 | 10/1967 | Shaper | 179/100.41 K |
| 3,538,266 | 11/1970 | Cho | 274/37 |
| 3,641,284 | 2/1972 | Westerkamp et al. | 274/37 |
| 3,926,441 | 12/1975 | Hibi et al. | 274/37 |

Primary Examiner—Steven L. Stephan
Attorney, Agent, or Firm—James J. Burke

[57] ABSTRACT

A magnetic stereo phonograph pick-up cartidge, including a removable stylus assembly of low mass which includes means for precisely aligning the armature with respect to the pole pieces. A boss on the stylus assembly and a mating aperture on the cartridge body assure alignment in the first instance, and a symmetrical, rubber, armature-pivot block is so positioned that perfect alignment between armature and pole pieces, and a proper tracking angle, are achieved only when the stylus is on a recording. The stylus assembly further includes a permanent magnet for energizing the armature, mounted so as to minimize interaction with the pole pieces and eliminate any distortion of the armature, and so provide a more linear, distortion-free response.

8 Claims, 5 Drawing Figures

U.S. Patent  Mar. 1, 1977  4,009,885
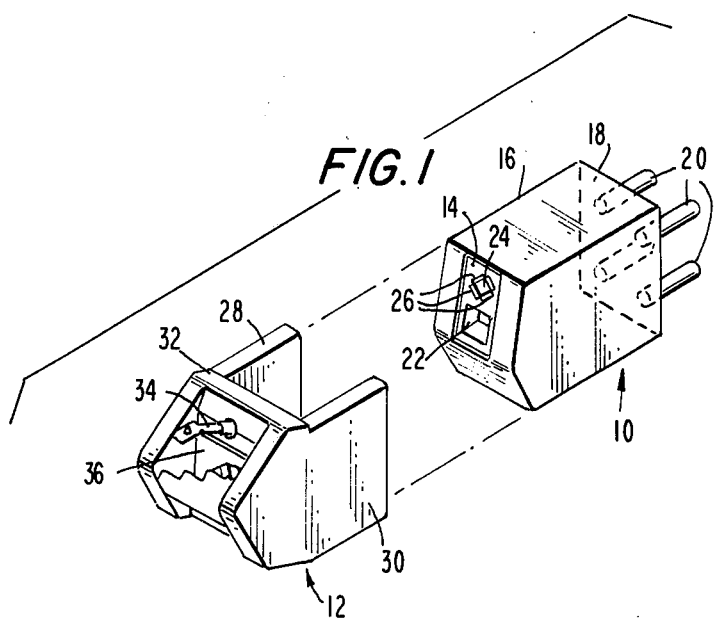
FIG. 1
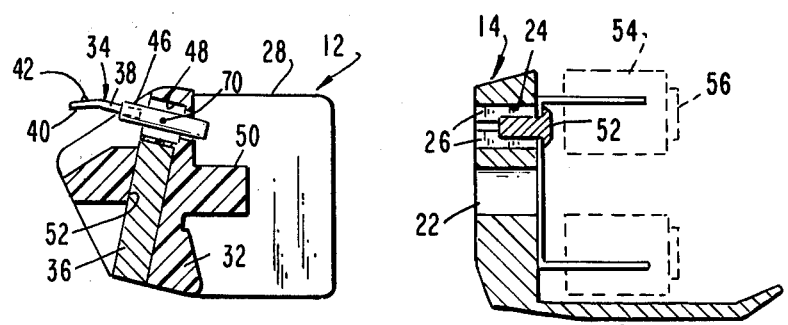
FIG. 2
FIG. 3
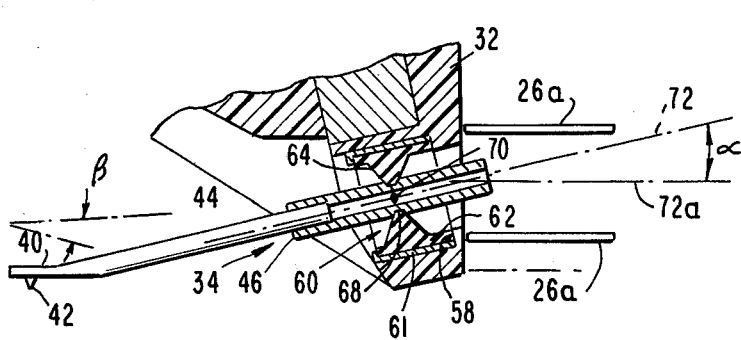
FIG. 4
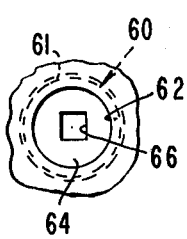
FIG. 5

STEREO PHONOGRAPH PICK-UP CARTRIDGE

BACKGROUND OF THE INVENTION

The present invention relates in general to magnetic stereo phonograph cartridges and, more particularly, it relates to such cartridges having a separate and replaceable stylus assembly.

As is well known, stereophonic phonograph records includes two sound tracks in the record groove which are mutually perpendicular to each other. In coordinate terms, the two tracks can be referred to as an $x$ track and a $y$ track. The stylus rides in the groove moving simultaneously as a function of the $x$ and $y$ tracks and, since the stylus cantilever is pivoted, an armature connected to it describes a corresponding motion at the end thereof opposed to the stylus. Functionally, $x$ motion is between (or adjacent) a first pair of spaced pole pieces of a first electromagnet circuit and $y$ motion is between (or adjacent) a second pair of spaced pole pieces of a second electromagnet circuit. As the armature is magnetized, voltages proportional to the $x$ and $y$ signals are induced in the respective circuits. While it would be convenient to visualize the $x$ and $y$ motions as horizontal and vertical, resulting from tracks on the bottom and one side of a three-sided groove, this so-called 0/90 system has never found commercial favor. Rather, today's stereophonic records have the tracks located on either side of a two-sided 90° groove, called, with reference to the vertical axis of the groove and the stylus, the 45/45 system. Operation is in precisely the same mode, but for the electromagnet circuits to generate signals responsive to each track, the two opposed pairs of pole faces must also be at the same 45° angle to the vertical axis.

Those familiar with the art will appreciate that any initial deviation by the armature from absolute dead center with respect to the four pole pieces is going to produce a distorted signal. What is perhaps not so apparent is that the dead-center positioning is only required when the tone arm is resting on a record, e.g. when a force equal to the tracking weight of the arm has already pivoted the stylus in the vertical direction. What is even less apparent is that in prior art devices the armature-energizing magnet was so positioned that it also acted to pull the armature from a dead-center position. Further, any mis-alignment of the stylus tip from the vertical will also produce a distorted signal and, while this is well recognized, convenient means for achieving it, or correcting a mis-alignment, have been lacking.

With respect to prior art, of which there is a substantial body, my own U.S. Pat. No. 3,294,405 may be considered typical. Alignment of the stylus assembly and the housing is there provided by ridges on the former and grooves on the later, the whole being retained by a pair of mounting screws. A rectangular elastomeric pivot block retains the armature-stylus (cantilever) assembly.

OBJECTS OF THE INVENTION

A general object of the present invention is to provide an improved stereo pick-up cartridge.

An important object of the present invention is to provide a stylus assembly for a stereo pick-up including means insuring precise alignment of the armature with respect to the pole pieces.

A further object of the present invention is to provide improved mounting means for styli in stereo pick-up cartridges.

Another object of the present invention is to provide improved linearity of response in stereo pick-up cartridges by a novel juxtaposition of the magnet, the armature and the pole pieces.

A still further object of the invention is to provide a stereo pick-up cartridge capable of meeting the above-listed objects, and which can be manufactured with high precision in a simple and economic manner.

Various other objects and advantages of the invention will become clear from the following description of embodiments thereof, and the novel features will particularly pointed out in connection with the appended claims.

THE DRAWINGS

Reference will hereinafter be made to the accompanying drawings, in which:

FIG. 1 is a perspective view of an embodiment of the present invention, with the stylus assembly spaced from the cartridge body for greater clarity;

FIG. 2 is a cross-sectional elevation view of the stylus assembly of FIG. 1;

FIG. 3 is a partial cross-sectional elevation view of a cartridge body in accordance with the invention, with certain conventional parts not shown;

FIG. 4 is a cross-sectional elevation view, greatly enlarged of the stylus-armature pivot arm and its mounting, and including a schematic representation of one pair of pole pieces; and FIG. 5 is an end view of the armature mounting block shown in cross section in FIG. 4.

DESCRIPTION OF EMBODIMENTS

With reference to FIG. 1, a stereo pick-up cartridge in accordance with the present invention comprises a main body 10 and a stylus assembly 12. The body 10 comprises, in its essential parts, a die-cast base 14 which acts as a support for the electromagnet/pole piece assembly, a sheet metal cover 16 and an insulating terminal board 18 forming the rear wall of the cartridge including male connectors 20. Base 14 and cover 16 are fabricated from non-magnetic materials. The front wall of base 14 includes a pair of apertures 22, 24 in vertical but not angular alignment. More particularly, lower aperture 22 is square or rectangular, and is aligned with the horizontal and vertical axes of base 14. It is, in essence, the mounting hole for stylus assembly 12. Upper aperture 24 is square, but has its corners aligned with the horizontal and vertical axes of base 14, e.g. its sides are skewed at 45° from either axis. The pole pieces 26 of the electromagnet circuits are secured to the sides of aperture 24 in a manner described in detail hereinbelow.

Stylus assembly 12 is, when viewed from above, a generally U-shaped body of molded plastic having a pair of rearwardly-extending legs 28, 30, the function of which is to frictionally engage the sides of cover 16, and a base portion 32 having a stylus cantilever 34 and a permanent magnet 36 mounted therein in a manner described hereinbelow in connection with FIG. 2 and FIG. 4.

The stylus cantilever 34 is conventional and per se forms no part of the invention. Its structure should be understood, however, and attention is directed to FIG. 4, where it is most clearly shown. This assembly comprises an aluminum tube 38 flattened and closed at one end 40 to form a rigid mount for the diamond stylus 42. At its opposed and open end 44, tube 38 is swaged or otherwise secured within a tube 46 of a suitable magnetically permeable material, nickel-base magnetic alloys being preferred because of their corrosion resistance. Tube 46 forms the magnetic armature of the cartridge.

Referring to FIG. 2, base portion 32 includes an aperture 48 for mounting a stylus cantilever 34 (shown in detail in FIG. 4) and, on its inside surface, an integrally formed, rectangular boss 50 which is positioned and dimensioned so as to be a slight interference fit with aperture 22 in base 14. While boss 50 and aperture 22 are conveniently rectangular or square, it will be appreciated that any non-circular shape may be employed. The permanent magnet 36 is frictionally secured in an opening 52 in the forward wall of base 32, directly below aperture 48 and on the same axis therewith.

In prior art cartridges, maintenance of the alignment of the pole pieces and the armature was dependent on the close fitting of several parts, including screws, covers and the like. Inevitably, with several parts involved, there is a build-up of tolerances, with the result that at the critical point, the pole piece-armature juxtaposition, precise positioning was a matter of chance. In the present invention, alignment is established and maintained by boss 50 and aperture 22 alone, where very close tolerances can be maintained, e.g. a slight interference fit which requires some pressure for it to be joined or taken apart. Because of the accurate positioning initially established with the present invention, it is possible to direct attention to other position-affecting factors not even considered in the prior art, and these are discussed hereinbelow.

The base 14 is most clearly shown in FIG. 3, and attention is directed thereto. The pole pieces 26 are preferably retained along the sides of aperture 24 by a plug 52 of a soft, non-magnetic metal such as lead. Pole pieces 26 are essentially conventional in design and function, as are the remainder of the electromagnet structures and circuits (windings 54, yokes 56 etc.) shown only in phantom. While it is preferred that base 14 be a zinc die-casting, because of relatively low cost and close dimensional tolerances that can be maintained, other materials can be employed. Dimensions of base 14 are reduced to the minimum consonant with the required functions, as it forms a significant portion of the mass of the entire cartridge, which is desirably kept to a minimum. However, the front wall of base 14 should be relatively thick, not only to accomodate the functions of apertures 22 and 24, but also to provide a measure of magnetic shielding that will prevent interference in operation of coils 54 by the field of magnet 36.

FIG. 4 illustrates the mounting of stylus cantilever 34 in base portion 32, which forms an important part of the present invention. Aperture 48 is round, and includes therein an inwardly-extending annular shoulder 58, which acts as a stop for the elastomeric stylus pivot block 60. A bushing 61, in firm frictional engagement with aperture 48, retains block 60 in position. Such blocks are known per se but block 60 differs in several respects from blocks heretofore employed. More particularly, block 60 comprises an outer, cylindrical portion 62 and an annular, inwardly-extending tapered portion 64 terminating in a square aperture 66 (FIG. 5). The magnetic tube 46 of stylus cantilever 34 is provided with an annular indentation or groove 68 of co-operating square shape, so that stylus cantilever 34 can be inserted in block 60 and, when tapered portion 64 and indentation 68 mate, the two become locked together. This arrangement provides a more precisely defined pivot point 70 than pivot blocks of prior art designs and, because of aperture 48 and cylindrical portion 62 being round, vertical alignment of stylus 42 can be microscopically checked and adjusted during assembly. Further, as assembled, stylus cantilever 34 is coaxial on center line 72, but this is not the correct alignment for tube 46 with respect to pole pieces 26 (shown only schematically at 26a in FIG. 5). Rather, when stylus 42 rests on a record (not shown) the tracking weight will cause stylus cantilever 34 to pivot a few degrees around pivot point 70, giving cantilever 34 a centerline axis 72a that is indeed precisely aligned with respect to pole pieces 26a. This corrective function is accomplished in practice by forming aperture 48 at an increased offset angle from the true tracking angle equal to the angle $\alpha$ between axis 72 and 72a. For reference purposes, FIG. 4 shows the tracking angle $\beta$, desirably about 15°, between centerline axis 72a and a simulated record surface 73.

In any magnetic cartridge, it is required that the energizing magnet be placed so as to saturate the armature but, to the least extent possible, charge the pole pieces, since any initial charge on the pole pieces pushes the signal further toward the top of the hysteresis curve where distortion is inherent. In practice, this has meant that the charging magnet was asymmetrically placed with respect of the armature (e.g. over the stylus and away from the pole pieces), thus presenting to the armature an asymmetric magnetic field tending to "pull" the armature from its true rest position. As is clear from FIG. 4, in the present invention, the pivot point 70, the middle of armature 46, and both longitudinal center axes of magnet 36 are all in the same planes, so the field of magnet 36 is equal on all sides with respect to the pivot point 70, and there is thus no magnetic moment pulling in any direction.

Further, by placing magnet 36 at almost a right angle to the pole pieces 26, the flux field is such that interaction between the two is minimized.

As is most clearly seen in FIG. 4, the end of armature tube 46 extends between the pole pieces 26a; this is contrary to some prior art teachings that say the armature should move in the same plane as the pole faces. It has been determined that in the present invention, a better magnetic coupling occurs with the armature going beyond the plane of the pole faces to a point between them. More particularly, because of the more precise alignment of the armature with respect to the pole pieces, smaller air gaps are possible, thus increasing the magnetic coupling.

In any magnetic cartridge it is desirable that the stylus cantilever have a low mass, that it be as short as possible, and that the center of mass of the cantilever pass through both the pivot point and the stylus tip. In most prior art cartridges, the latter has not been possible because the arrangement of the various parts required that the stylus tip be deliberately off-set so that the assembly would clear the record surface. In the present invention, no such off-set is required and the center of mass passes through both the pivot point and the stylus tip, thus eliminating any moments of force which would tend to produce distortion. A further advantage of this arrangement is that the entire cantilever assembly may be extremely short, in a preferred embodiment measuring less than 0.250 in.

A still further feature of the present invention that distinguishes it from many prior art cartridges is the complete lack of adhesively-joined parts. Use of adhesives such as epoxies must inherently introduce tolerances that are avoided if parts are in tight frictional engagement. In the present invention, pivot block 60 is frictionally engaged in bushing 61, which is a push-fit in aperture 48; magnet 36 is frictionally engaged within assembly 12, which, of course, frictionally engages the main body, both along sides 28, 30 and by means of boss 50. All of these measures reduce tolerances and result in a superior cartridge.

Alternative structures to those hereinabove described and illustrated as a preferred embodiment of the invention are of course possible. Obviously, the same structure with but one electromagnetic circuit and pair of pole pieces would be suitable for monaural recordings.

Various other changes in the details, materials, steps and arrangements of parts, which have been herein described and illustrated in order to explain the invention, may be made by those skilled in the art within the principle and scope of the invention as defined in the appended claims.

What is claimed is:

1. An electromagnetic pick-up cartridge for phonograph records comprising:
   a housing containing sensing means and having a noncircular aperture in the forward wall thereof;
   a stylus assembly including a rearwardly-extending boss adapted for insertion into said aperture in a slight interference fit, whereby said assembly may be secured to said housing;
   a stylus cantilever mounted in said stylus assembly on a resilient pivot block, said pivot block comprising an outer, cylindrical portion and an inner, inwardly-tapering portion terminating in a square, stylus cantilever-engaging aperture, said engagement defining the pivot point of said cantilever;
   a magnetically permeable armature forming part of said cantilever; and
   a magnet mounted in said stylus assembly to magnetically energize said armature.

2. An electromagnetic pick-up cartridge for phonograph records comprising:
   a housing containing an electromagnetic circuit including a pair of coils and a pair of pole pieces extending exterior of said coils into a first aperture in the forward wall of said housing;
   a second, non-circular aperture in the forward wall of said housing;
   a stylus assembly detachably securable to said housing and including a rearwardly extending boss adapted for insertion into said second aperture in a slight interference fit;
   a pivotally mounted stylus cantilever on said stylus assembly and including a rearwardly-extending magnetically permeable armature, said armature extending into said first aperture when said stylus assembly is secured to said housing; and
   a permanent magnet mounted in said stylus assembly and positioned to magnetically energize said armature.

3. The pick-up cartridge as claimed in claim 2, wherein said housing contains two electromagnetic circuits including two pairs of pole pieces extending into said first aperture.

4. The pick-up cartridge as claimed in claim 2, wherein said boss and said second aperture are rectangular.

5. The pick-up cartridge as claimed in claim 2, wherein said pivotal mounting includes a resilient pivot block secured in an aperture in said stylus assembly, said pivot block comprising:
   an outer, cylindrical portion;
   an inner, inwardly-tapering portion; and
   a square, stylus cantilever-engaging aperture.

6. The pick-up cartridge as claimed in claim 5, wherein said pivot block aperture is at a predetermined angle with respect to a recording and said pole pieces, said angle being such that said stylus cantilever is at a desired angle to said recording, and said armature is in a desired spatial relation to said pole pieces, only when said cartridge is resting on a recording with a desired tracking pressure, and said stylus cantilever is pivoted thereby.

7. The pick-up cartridge as claimed in claim 2, wherein said stylus assembly includes a front wall including said stylus cantilever, said magnet and said boss, and additionally comprising a pair of rearwardly-extending legs adapted to frictionally engage the sides of said housing.

8. The pick-up cartridge as claimed in claim 2, wherein said magnet is mounted at an approximate right angle with respect to said armature and with the center axes of said magnet passing approximately through said pivot point of said armature, to charge same in the absence of any net magnetic moments thereon.

* * * * *